United States Patent [19]
Kawaguchi et al.

[11] 4,256,346
[45] Mar. 17, 1981

[54] WHEELS FOR VEHICLES, SUCH AS MOTORCYCLES

[75] Inventors: Takeshi Kawaguchi; Yasuhisa Kobayashi; Masayuki Onimaru, all of Saitama, Japan

[73] Assignee: Honda Giken Kogyo Kabushiki Kaisha, Tokyo, Japan

[21] Appl. No.: 952,096

[22] Filed: Oct. 17, 1978

Related U.S. Application Data

[63] Continuation-in-part of Ser. No. 784,053, Apr. 4, 1977, Pat. No. 4,181,365.

[30] Foreign Application Priority Data

| Apr. 8, 1976 | [JP] | Japan | 51-43487 |
| May 1, 1976 | [JP] | Japan | 51-55235 |
| Jun. 25, 1976 | [JP] | Japan | 51-83689 |
| Jul. 7, 1976 | [JP] | Japan | 51-80602 |

[51] Int. Cl.³ .............................................. B60B 1/10
[52] U.S. Cl. ................................. 301/64 SH; 301/66; 301/67; 301/74
[58] Field of Search ............ 301/6 V, 63 DD, 63 DS, 301/64 R, 64 SH, 66, 67, 73, 74

[56] References Cited
U.S. PATENT DOCUMENTS

| 766,439 | 8/1904 | Gilbert | 301/74 X |
| 1,330,096 | 2/1920 | Sherwood | 301/74 X |
| 1,383,405 | 7/1921 | Knappen | 301/64 R |
| 3,410,605 | 11/1968 | Mayrath et al. | 301/64 R |

FOREIGN PATENT DOCUMENTS

| 78305 | 12/1949 | Czechoslovakia | 301/63 DD |
| 105964 | 5/1917 | United Kingdom | 301/63 DS |

Primary Examiner—Charles A. Marmor
Attorney, Agent, or Firm—Irving M. Weiner; Pamela S. Burt; John L. Shortley

[57] ABSTRACT

An improved wheel construction for a motorcycle or other vehicle wherein a wheel hub is combined wih a wheel rim by a plurality of pairs of radially-extending trapezoidal-shaped spoke members, each pair including two symmetrically opposed spoke members. In the vertical cross-section, the oppositely-disposed spokes of each pair from an isosceles triangle with the hub forming the base of the triangle, while a second triangle is formed by opposite side edges of adjacent spokes (in a side view) and a part of the wheel rim, with the apex of the second triangle formed at an intermediate connecting portion between the radially extending spokes.

10 Claims, 15 Drawing Figures

WHEELS FOR VEHICLES, SUCH AS MOTORCYCLES

This application is a continuation-in-part of co-pending application Ser. No. 784,053, filed Apr. 4, 1977, which issued as U.S. Pat. No. 4,181,365 on Jan. 1, 1980.

BACKGROUND OF THE INVENTION

1. Field of the Invention

The present invention relates generally to wheels for vehicles.

In particular, the invention relates to a wheel to be used primarily for autobicycles or motorcycles wherein a wheel rim and hub are combined with each other through a plurality of pairs of spoke members, each spoke member having a generally trapezoidal shape which expands toward the hub of the wheel, the members being designed to replace conventional wire spokes employed on autobicycles or motorcycles.

The pairs of spoke members according to the invention provide a wheel construction which is simplified in structure, facilitates assembly of the wheel, improves the appearance of the wheel, and generally reduces costs while providing a strong and rigid wheel construction.

Particularly, in the wheel construction according to the present invention, the connecting portions of each spoke to the wheel hub are positioned substantially along a line extending from the side edges of the spoke, i.e., on the line of action of a load on the wheel applied in both the circumferential and the radial directions. The adjacent spokes are connected to the wheel hub at the intermediate portion therebetween so that the connecting portion is positioned at the apex of a triangle formed by opposite side edges of the adjacent spokes and a part of the wheel rim.

2. Description of the Prior Art

In general, many prior art motorcycle wheel constructions have included a large number of wire spoke members connecting the rim of the wheel with the hub thereof. Such constructions have the attendant disadvantage of requiring a complicated assembly procedure wherein each wire spoke must be fastened with a uniform force, and generally assembly and balancing is difficult, especially in view of the very large number of wire spoke members employed. As a result, manufacture of such constructions is difficult and costly. In addition, special tools are required to tighten loose wire spokes when they become loose after use, and considerable skill is required for such tightening.

An alternate type of prior art motorcycle wheel construction provides a rim and hub combined with each other by a disc, or a rim and disc integrally combined with each other and combined with the hub. This type of construction also has attendant disadvantages, however, such as unfavorable appearance, excessive weight, or wasted material if the disc is punched and cut to reduce weight.

Another main disadvantage attendant prior art wheel constructions for motorcycles is that because the spoke members are affixed to the hub of the wheel in such a manner that they are out of the line of action of a load on the wheel, such constructions do not sufficiently and effectively support the wheel against the load, particularly in the circumferential direction.

The present invention eliminates the disadvantages attendant such prior art constructions, and provides a wheel construction which can be easily assembled, is inexpensive to manufacture, and is surprisingly strong and rigid. A very favorable appearance is also provided by the wheel according to the invention.

SUMMARY OF THE INVENTION

The invention provides a wheel for a vehicle which includes a wheel hub, a wheel rim having at least one projection on the inner surface thereof, and at least a pair of spokes which are mechanically and operably connected to the wheel hub and the rim projection. The wheel hub and pair of spokes form, in a vertical cross-section, a first triangle having the apex at the connection of the spokes to the rim projection. Each pair of spokes extends in the radial direction of the wheel and is connected to the wheel hub at intermediate portions between the radially extending pairs of spokes, adjacent to each other. The intermediate connecting portion forms the apex of substantially a second triangle defined by opposite side edges of the adjacent spokes and a portion of the wheel rim.

It is an object of the present invention to provide a wheel wherein the radially extending spokes comprise a plurality of separate spoke members connected to the wheel hub by common fastening means which connect adjacent pairs of spokes to the wheel hub.

A further object of the invention is to provide a wheel construction wherein the radially extending spokes are made integrally of a sheet metal material.

Yet another object of the invention is to provide spokes which are formed in a trapezoidal shape which expands toward the wheel hub to thus provide more sufficient rigidity and strength against a load on the wheel, particularly in the radial direction.

Another object is to provide a wheel construction including a rim wherein a projection is provided in the form of a ring over the entire periphery of the inside diameter portion and is employed as a spoke fitting member, so as to increase the strength and rigidity of the rim, while making the rim lighter.

A further object of the invention is to provide a wheel construction including a combining structure wherein the tip parts of the spokes are connected to the projection on the rim such that both tip parts of a pair of spokes are disposed on one side of the projection so that the fitting parts of the pair of spokes will be concealed on at least one side of the wheel to thereby enhance the overall appearance of the wheel.

Yet another object is to provide a wheel construction including a combining structure wherein the projection on the wheel rim is formed by two parallel rows of projecting portions and the tip parts of a pair of spokes are interposed and fastened between the two projecting portions.

Other objects and details of the present invention will become apparent from the following description, when read in conjunction with the accompanying drawings.

DETAILED DESCRIPTION

Figure 1:
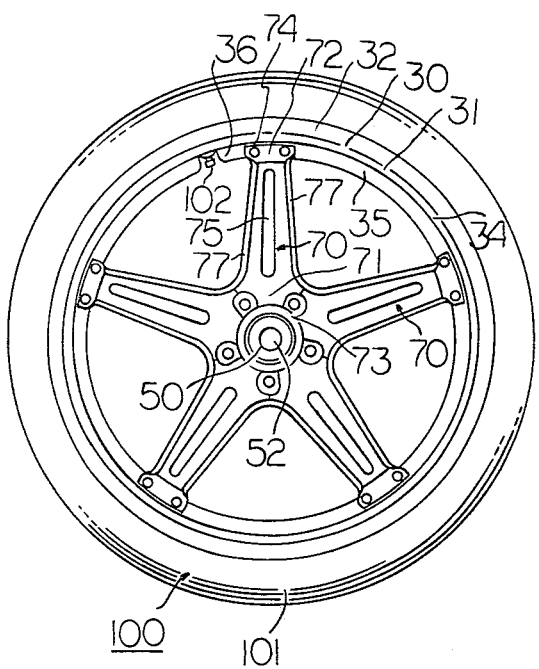
FIG. 1 depicts a side elevational view of a wheel according to a first embodiment of the invention.
Figure 2:
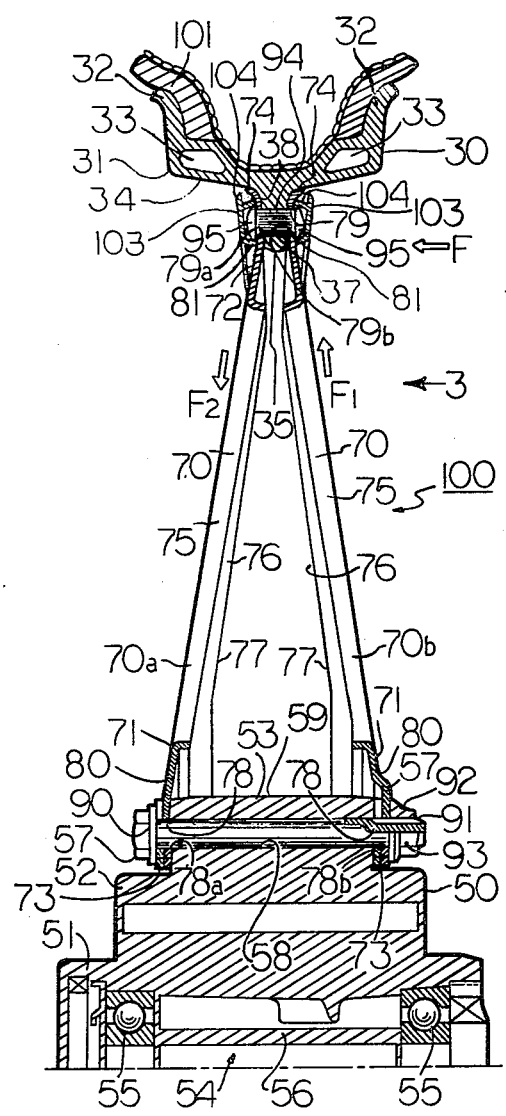
FIG. 2 illustrates a vertically sectioned view in the axial direction of the wheel of FIG. 1, only half of the wheel being magnified.
Figure 3:
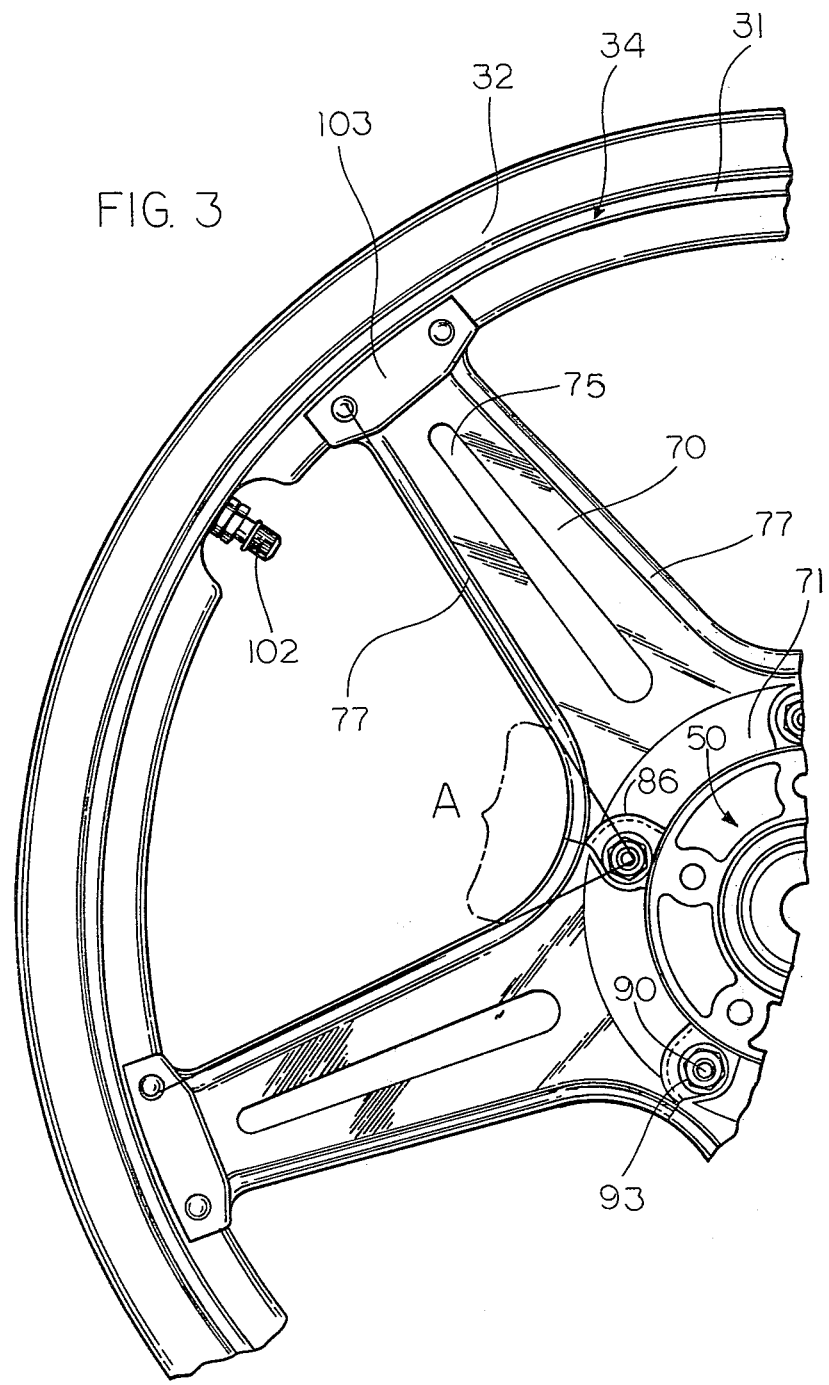
FIG. 3 is a view taken in the direction of arrow 3 in FIG. 2, showing only essential parts.

With reference to FIGS. 1-3, there is shown a vehicle wheel 100, particularly a motorcycle wheel, comprising a rim 30, at least one or a plurality of pairs of spoke members 70, and a hub 50. Rim 30 is shaped by extruding or rolling an aluminum alloy or the like, and is formed to be truly circular or ring-shaped. Rim 30 includes a substantially flat body portion 31 in a direction parallel with the direction of an axle. Ear pieces 32 are disposed on the outer periphery on the right and left, respectively, of body 31, integrally shaped to be ring-shaped. Cut-away portions 33 (FIG. 2) are provided on the right and left over the entire periphery in the peripheral direction within body 31 so that body 31 is thick and light, yet strong.

Figure 4:
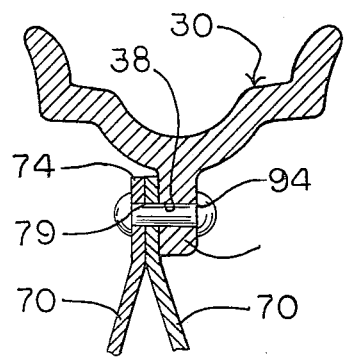
FIG. 4 depicts a sectioned view of a first assembly of a portion of the spokes with a projection on the inside diameter portion of a rim.
Figure 5:
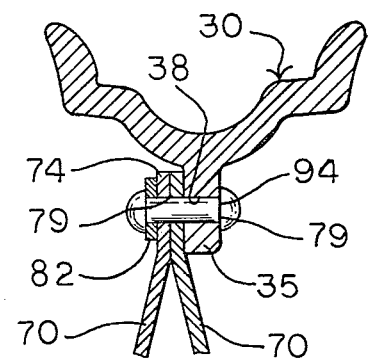
FIG. 5 illustrates a sectioned view of the FIG. 4 assembly, including a washer member.
Figure 6:
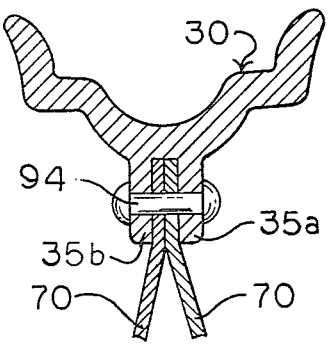
FIG. 6 depicts an alternate assembly of the spokes with a projection on the inside diameter portion of a rim.

A projection 35 of a relatively small width projects from the central part in the width direction of the inner diameter portion of rim 30 in a direction towards the center of wheel 100 (FIGS. 2, 4 and 5). Projection 35 is integral with body 31, and a required number of such projections 35 may be provided in a part of the inside diameter portion 34 of the rim. Preferably, however, projection 35 is formed to be ring-shaped over the entire periphery of portion 34 of rim 30. Projection 35, provided over the entire periphery of portion 34, functions as a rib to improve the strength in the inside diameter portion of the rim, and improves the rigidity and strength in the vertical direction of rim 30. A portion of projection 35 is cut-away at 36 to accommodate an air valve 102 of a tire to be mounted on wheel 100. As shown in FIG. 6, projections 35 may be provided on rim 30 in two parallel rows so as to form a groove therebetween, as will be described in greater detail hereinbelow.

Each pair of spokes 70 includes two spokes 70 symmetrically disposed on the right and left as shown, for example, in FIG. 2. Each spoke 70 is a press-shaped product of a steel plate material. Because the wheel is exposed when employed on an autobicycle or motorcycle, in order to guard against corrosion and to enhance the appearance thereof, it is preferable that the spoke 70 be constructed of a stainless steel plate material having a favorable appearance, or a steel plate material which is treated on the surface thereof by plating.

Each spoke 70 shown in FIGS. 1 through 3 is formed to be relatively wide in its base portion 71 on the hub fitting side, and to be relatively narrow in its tip portion 72 on the rim fitting side, defining a substantially trapezoidal shape. In the illustrated embodiment, spoke 70 is curved to be wider on the right and left of base portion 71, is linearly extended toward tip portion 72 somewhat tapered from the curved base part, and is formed to be somewhat wider in portion 72 so as to be a fitting part. The inner peripheral edge 73 of portion 71 is formed to be arcuate, with a curvature conforming to the outer peripheral surface of the arcuate stepped part 52 of the intermediate portion of hub 50. The outer peripheral edge 74 of portion 72 is arcuate, with a curvature conforming to the inner peripheral arcuate surface of portion 34 of rim 30.

In FIGS. 1 through 3, spoke 70 is provided with a through hole 75 formed longitudinally in the intermediate portion of spoke 70 so as to lighten it.

As shown in FIG. 2, hub 50 includes three stepped parts which vary in length in the axial direction. Hub 50 includes intermediate arcuated stepped part 52 which is narrower than the body 51 which is longest in the axial direction, and is wider than an outer peripheral part 53. An axle inserting hole 54 is made through the center of body 51. Bearings 55 are fitted in both end portions within body 51, and a collar 56 is fitted in the intermediate portion thereof.

Body 51 and stepped parts 52 and 53 of hub 50 are circular and concentric. Both surfaces 57 in the axial direction of part 53 are perpendicular to the axis of wheel 100, and are flat so as to form seat surfaces for fitting portions 71 of spokes 70.

Spokes 70 of each pair are symmetrically opposed to each other, and fitting holes 78 are provided proximal to the portion 71 of each spoke. An inserting hole 58 is provided between both end surfaces 57 through part 53 of hub 50. A bolt 90 is passed through hole 58 from the hole 78a of one spoke 70a, and the hole 78b of the opposite spoke 70b fitted on the other side. A nut 93 is screwed on the end screw portion to screw and fasten spokes 70a and 70b to hub 50. A groove 91 is provided in the end portion of bolt 90, and a roller 92 is pressed into groove 91 to prevent the nut 93 from loosening.

As shown in FIG. 2, tip parts 72 of spokes 70 contact both opposing surfaces of projection 35 of rim 30. Inserting holes 38 passing through both surfaces 37 are provided in projection 35. Part 72 of each spoke is provided with corresponding fitting holes 79 near both ends thereof. A rivet 94 is passed through the hole 79a of one spoke 70a, the hole 38 of projection 35, and the hole 79b of the other spoke 70b and is pressed to bind parts 72 of the spokes 70a and 70b to both side surfaces of projection 35.

Pairs of spokes 70 are combined with rim 30 and hub 50 to be in the form of an isosceles triangle in which the apex is on projection 35, the base is the outer peripheral portion 59 of the outer peripheral stepped part 53 of hub 50, and the hypotenuses are formed by the spokes as shown in FIG. 2. Spokes 70 are radially arranged in the peripheral direction in a plurality of pairs, such as five pairs as shown in FIG. 1.

Because the pairs of spokes 70 are combined to form an isosceles triangle with the apex on the rim side and the base on the hub side, a load from a road surface will act on rim 30, spokes 70 and hub 50, through a tire 101 fitted to rim 30. Particularly, when a lateral load F acts on the combining part of the wheel, one spoke will be subjected to a tensile force $F_1$, but the other spoke will be subjected to a compressive force $F_2$. The lateral load F will not act on the spokes as a bending force as would occur if the spokes were disposed in parallel. According to the invention, sufficient lateral rigidity and lateral load strength is obtained and an effective motorcycle wheel of great strength is obtained. Even if the thickness of the spoke is reduced, sufficient strength is obtained. Thus, the spoke can be made thin and light. Even if the spoke is of a simplified shape and is provided with a window or hole, a lateral rigidity and lateral load strength sufficient for a wheel is obtained, freedom in design selection is enhanced, and a favorable wheel design may be selected. Particularly, the wheel for autobicycles or motorcycles is so large in diameter and so narrow in width that a substantial lateral load strength and lateral rigidity is required, and such strength and rigidity can be effectively obtained with the wheel construction in accordance with the present invention.

With reference to FIGS. 4-6, there is shown alternate arrangements for connecting tip parts 72 of spokes 70 to projection 35 of rim 30. In FIG. 4, the pair of spokes 70 are shown with their respective tip parts 72 connected together adjacent the same side of projection 35. The tip parts 72 are provided with fitting holes 79 and inserting holes 38 are provided in projection 35, as described hereinabove with reference to FIG. 2, and a rivet 94 is passed through the fitting holes 79 and inserting hole 38 and is pressed, to thus bind tip parts 72 to projection 35. In this manner, the tip parts 72 are secured to projection 35 on only a single side thereof so that the fitting parts 72 of the pair of spokes 70 will be concealed on at least one side of wheel 100, thus enhancing the appearance of wheel 100.

In FIG. 5, tip parts 72 of the pair of spokes 70 are secured to projection 35 of rim 30 in much the same manner as described with reference to FIG. 4, on a single side of projection 35. However, in FIG. 5 there is provided a washer 82 adjacent the outside surface of one of the spokes 70 away from projection 35.

In FIG. 6, tip parts 72 of the pair of spokes 70 are fastened within a groove formed in projection 35 by portions 35a and 35b of projection 35. The portions 35a and 35b of projection 35 comprise two parallel rows of projections, and permit interposing and fastening of tip parts 72 of spokes 70 therebetween. In this arrangement, a rivet 94 is employed in substantially the same manner as described hereinabove to fasten tip parts 72 to projection 35 within the groove defined between portions 35a and 35b.

Figure 7A:
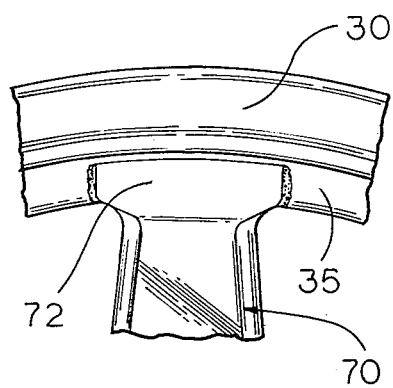
FIG. 7A illustrates a welded connecting means of the spokes to the rim projection.
Figure 7B:
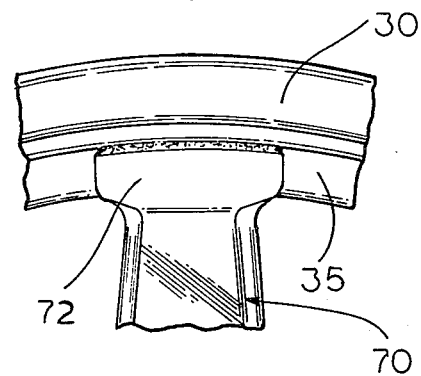
FIG. 7B depicts a modification of a welded connecting means of the spokes to the rim projection.
Figure 7C:
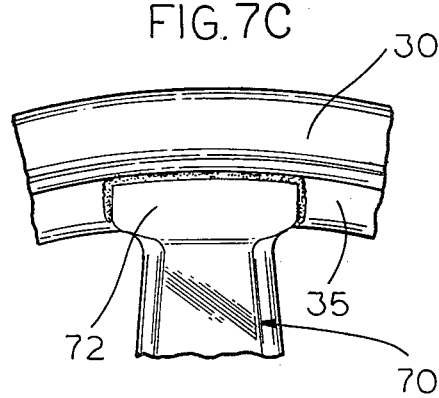
FIG. 7C illustrates another modification of a welded connecting means of the spokes to the rim projection.

With reference to FIGS. 7A, 7B and 7C, there is shown modified means for connecting part 72 of the spoke 70 to rim projection 35. In contrast to the connecting means disclosed in FIGS. 4-6, the means shown in FIGS. 7A-7C employ welding as a connection means, rather than rivets or bolts and nuts. In FIG. 7A, the side edges of tip part 72 of spoke 70 are welded to projection 35. In FIG. 7B, the outer peripheral edge of part 72 is welded to projection 35. In FIG. 7C, both the side and the outer peripheral edges of part 72 are welded to projection 35. It will be understood that the portions of spoke part 72 to be welded to rim projection 35 may be freely selected, and FIGS. 7A-7C are merely illustrative of the types of welded connections which may be made.

The structure for combining the spokes 70 with hub 50 will be described with reference to FIGS. 8-12. Spokes 70 are each provided with fitting holes in two opposite lower side portions of part 71 of spoke 70. Preferably, and in order to increase the strength and rigidity of the wheel, the span between the combining places of spokes 70 to hub 50 are set to be as long as possible. Because each spoke 70 is fastened and combined in two places on the hub 50, the number of bolts would ordinarily be double the number of spokes 70. However, this large number of bolts is not advantageous with regard to weight considerations, and also results in more complicated assembly.

To eliminate an excessive number of bolts and the disadvantages attendant thereto, the fitting parts 86 and 87 having the fitting holes 78 provided on the right and left of part 71 are expanded in a sidewise direction so that holes 78 may be formed on the boundaries between the expanded fitting parts 86 and 87 so that the holes 78 are positioned at the apex of a second triangle formed by opposite side edges of adjacent spokes 70 and a portion of rim 30, as clearly shown in FIG. 3. Thus, the connecting portions of each spoke 70 to hub 50 are positioned substantially on a line extending from the side edges of spoke 70, i.e., on the line of action of a load on wheel 100 applied in the circumferential direction as well as the radial direction. In this manner, a sufficient rigidity and strength against the load on the wheel will be provided, particularly in the circumferential direction. In FIG. 3, the chain lines A indicate the line of action of load on the wheel applied in the circumferential direction.

As shown in FIGS. 8-12, parts 86 and 87 are expanded to be semicircular. The fitting part 86 on one side comprises a stepped fitting part 86 projected in the direction of the outside surface of spoke 70 to be in the form of a circle expanded sidewise. The amount of projection of stepped part 86 on the spoke surface is a height W (FIG. 10) equal to the thickness of spoke 70. Part 87 on the opposite side of spoke 70 is flat so that the surface of the fitting part 87 is adapted to contact the back surface of stepped part 86.

Figure 8:
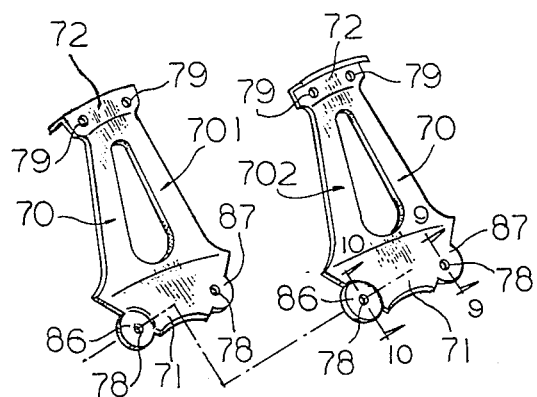
FIG. 8 depicts a disassembled perspective view of two spokes, showing a fitting portion of the spokes for fitting the spokes to a hub.
Figure 9:
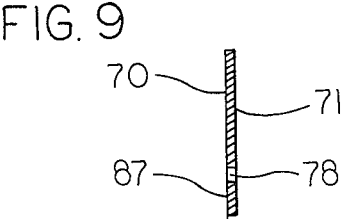
FIG. 9 illustrates a magnified sectioned view taken along line 9—9 in FIG. 8.
Figure 10:
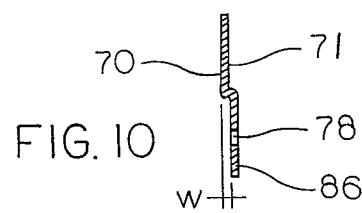
FIG. 10 depicts a magnified sectioned view taken along line 10—10 in FIG. 8.
Figure 11:
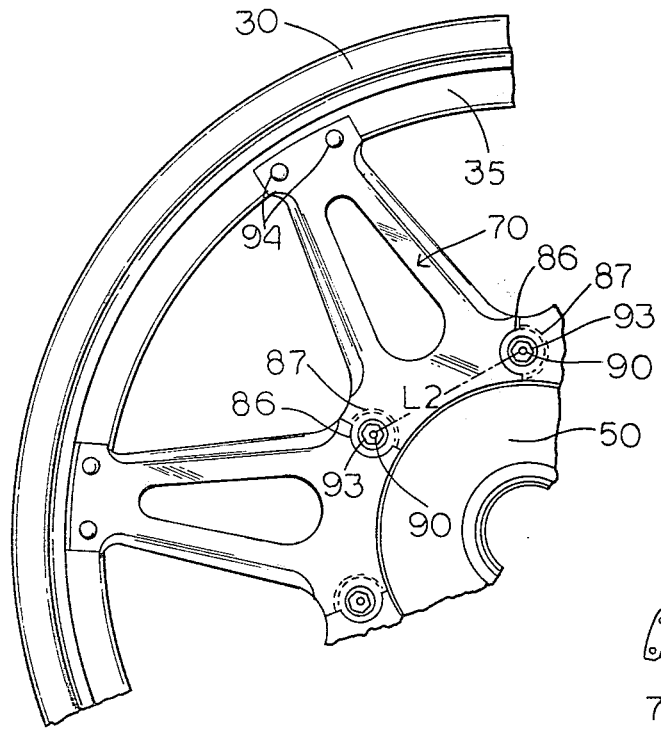
FIG. 11 illustrates the common fastening means employed between adjacent spokes for fastening same to the hub.
Figure 12:
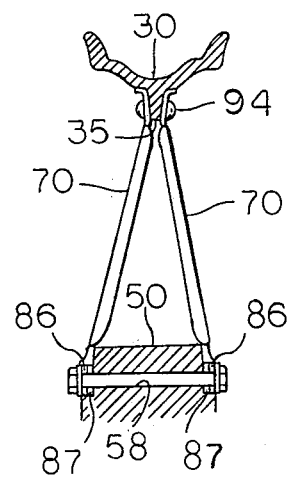
FIG. 12 depicts a vertically sectioned view showing a pair of spokes connected between the wheel rim and hub.

With reference to FIG. 8, when spokes 70 are fastened on the periphery of hub 50, parts 86 and 87 of one spoke 701 and the other spoke 702 are overlapped on each other and the expanded part 87 will enter the stepped part in the base portion of part 86 so that holes 78 will be aligned. Bolt 90 is inserted through hole 58 provided in the outer peripheral stepped part 53 of hub 50, fitted through holes 78, and is screwed and fastened with a nut 93. The other free fitting part and the opposed fitting part of the next adjacent spoke 70 is combined in the same manner as described above, and the overlapped fitting parts of the spokes 70 are each combined with each other by a bolt and nut arrangement. The end parts of the base parts of the adjacent spokes 70 are fastened with one bolt in common, and each of the spokes to be assembled on the periphery of hub 50 is thus combined with the bolts in common, as shown in FIGS. 11 and 12.

Because each spoke 70 is combined with the adjacent spoke 70 through one common bolt by overlapping the right and left end parts on the hub fitting side of the respective spokes as above described, the span $L_2$ (FIG. 11) between the combining parts will be long. Because spokes 70 are not independently combined, they will be fitted to hub 50 with a substantially long and equal span $L_2$ between the combining parts, around the periphery of hub 50. Also, because the bolts employed for combining the spokes 70 to the hub 50 are used in common, the number of bolts will be reduced to half the total number of combining parts. Thus, assembly is facilitated, weight of the wheel is reduced due to a decrease in the number of component parts, and the cost of the wheel will also be reduced. Even though the number of bolts is reduced, because the base part of each spoke 70 is secured to the hub at two places at both ends of the spoke, it will be combined in a strong and stable manner, without impairing the strength of the combining part. In addition, the span between the combining parts will be made sufficiently large, and the strength and rigidity of the wheel will be enhanced without using any special member or modifying the structure of the wheel.

Figure 13:
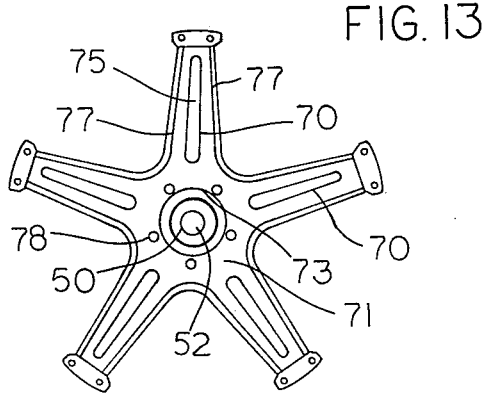
FIG. 13 illustrates a plurality of spokes which are press-shaped integrally with each other from a sheet metal material.

With reference to FIG. 13, an alternate structure for the spokes 70 is illustrated. In this embodiment, a plurality of spokes 70, five in this example, are integrally formed in a starfish-shape from a sheet metal material. The starfish-shaped integral spoke member is formed by being press-shaped from the sheet metal material, and a pair of such members are employed in a symmetrically-opposed manner to provide the various pairs of spokes 70 (each including two symmetrically oppositely-disposed spokes 70) as described hereinabove. With the starfish-shaped member as shown in FIG. 13, five such pairs of spokes 70 will be provided when two of the integral members are oppositely disposed relative to each other.

It should be understood that the triangle defined by opposite side edges of adjacent spokes 70 and a portion of rim 30 as described hereinabove with respect to FIG. 3 is also applicable to the integral spoke member embodiment disclosed in FIG. 13. The fitting holes 78 provided in the integral spoke member illustrated in FIG. 13 are so positioned that they define the apex of such triangle, and are positioned substantially on a line extending from the side edges of each spoke 70 of the integral starfish-shaped member. Thus, the connecting portions of the spokes 70 of the starfish-shaped member to hub 50 are positioned in a manner which will ensure rigidity and strength against the load on the wheel, particularly in the circumferential direction.

With regard to the shape of the spokes 70 of the various above-described embodiments, because each spoke 70 is formed in a generally trapezoidal shape which expands toward the hub 50, more sufficient rigidity and strength of the wheel can be attained, particularly in the radial direction. With the spokes 70 thus formed, the wheel is supported against loads in every direction as follows: (1) A lateral load is efficiently supported by virtue of the first triangle formed by the oppositely-disposed pair of spokes 70 and the wheel hub (apex on the rim side and base on the hub side). (2) A vertical load received from the road surface is effectively supported by virtue of the trapezoidal shape of the spokes 70. (3) A load in the circumferential direction is effectively supported by virtue of the second triangle formed by opposite side edges of adjacent spokes 70 and a part of rim 30, having the apex formed by the connecting portion of the adjacent spokes 70 to the hub 50.

Although there have been described what are at present considered to be the preferred embodiments of the present invention, it will be understood that various modifications may be made therein, without departing from the spirit or essential characteristics thereof. The present embodiments are therefore to be considered in all respects as illustrative, and not restrictive. The scope of the invention is indicated by the appended claims rather than by the foregoing description.

We claim:

1. A wheel for a vehicle, comprising:
a wheel hub;
a wheel rim having at least one projection on the inner surface thereof;
a plurality of pairs of oppositely-disposed spokes which are mechanically and operably connected to said wheel hub and said rim projection;
one spoke of each said pair of spokes being connected adjacent one side of said wheel hub, and the other spoke of each said pair of spokes being connected adjacent the opposite side of said wheel hub;
said wheel hub and each of said pairs of spokes forming in a vertical cross-section a first triangle having the apex thereof defined at the connection of said spokes to said rim projection;
each said spoke of each said pair of spokes extending in the radial direction of said wheel and being connected to said wheel hub at intermediate connecting portions between adjacent ones, in the circumferential direction, of said radially extending spokes;
each said intermediate connecting portion being disposed on a line extending from opposite side edges of adjacent ones of said radially-extending spokes, said line defining the line of action of a load on said wheel; and
each said intermediate connecting portion forming the apex of a second triangle defined by opposite side edges of adjacent radially extending spokes and a portion of said wheel rim.

2. A wheel according to claim 1, wherein:
said radially extending spokes comprise a plurality of separate spoke members connected to said wheel hub by common fastening means which connect said adjacent spokes to said wheel hub.

3. A wheel according to claim 1, wherein:
said radially extending spokes are connected to said rim projection at at least two points.

4. A wheel according to claim 3, wherein:
said radially extending spokes are connected to said rim projection by rivets.

5. A wheel according to claim 3, wherein:
said radially extending spokes are connected to said rim projection by welding.

6. A wheel according to claim 1, wherein:
a plurality of said radially extending spokes are integrally formed from a sheet metal material, so as to define an integral spoke member;
a pair of said integral spoke members are relatively oppositely symmetrically disposed between, and connected to, said wheel hub and said rim projection; and
said plurality of pairs of spokes are each defined by respective oppositely disposed spokes of said pair of spoke members.

7. A wheel according to claim 1, wherein:
each said spoke is formed in a trapezoidal shape which expands toward said wheel hub.

8. A wheel according to claim 1, wherein:

said radially extending spokes are connected to said rim projection on one side of said projection, with said spokes being connected together adjacent said one side of said projection.

9. A wheel according to claim 1, wherein:
said wheel rim is provided with two spaced apart parallel projections on the inner surface of said rim, said two projections defining a groove therebetween; and
said spokes are connected to said rim within said groove defined by said two rim projections.

10. A wheel according to claim 6, wherein:
each said integrally-formed spoke member has a starfish shape.

* * * * *